Sept. 29, 1953 H. G. BOYLE 2,653,995
INTERCARRIER SOUND TYPE TELEVISION RECEIVER VOLUME CONTROL
Filed Aug. 30, 1950
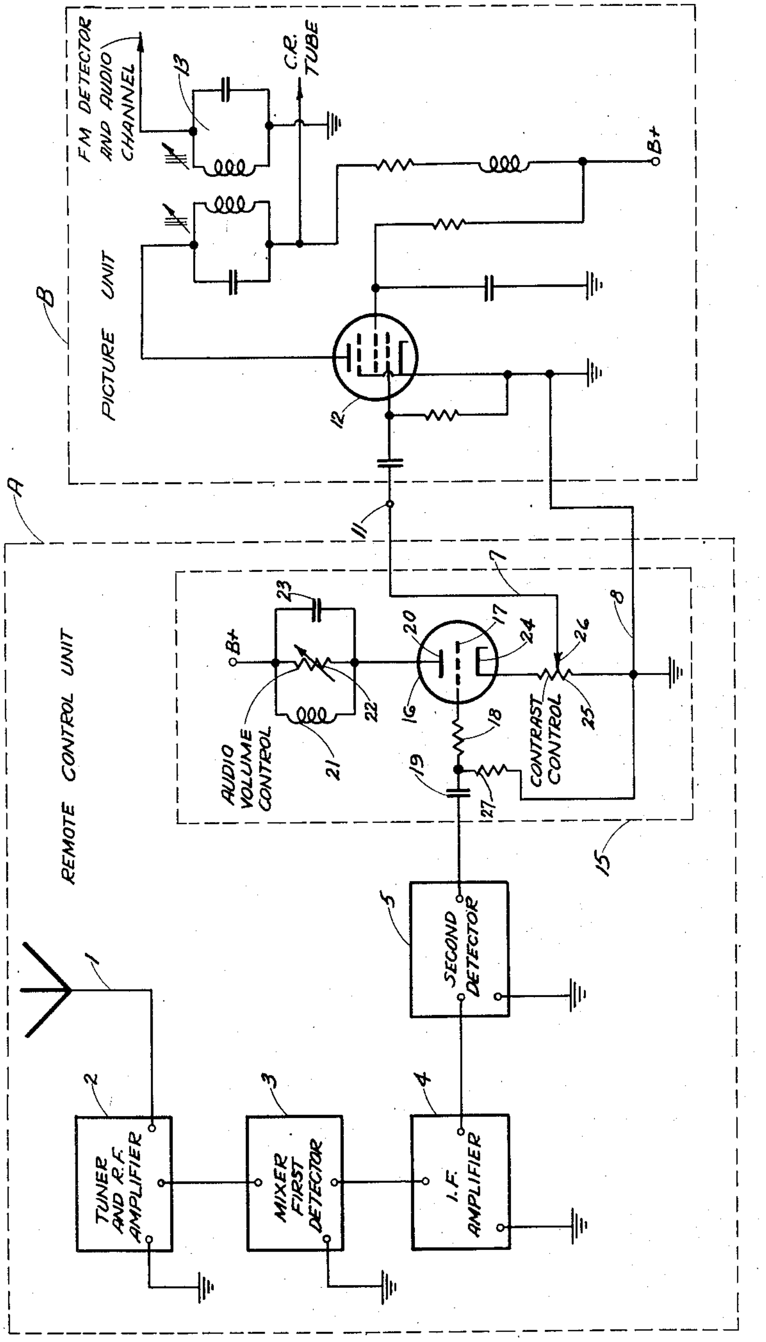
INVENTOR.
HOMER G. BOYLE
BY
Alden D. Redfield
ATTORNEY.

Patented Sept. 29, 1953 2,653,995

UNITED STATES PATENT OFFICE 2,653,995

INTERCARRIER SOUND TYPE TELEVISION RECEIVER VOLUME CONTROL

Homer G. Boyle, Cincinnati, Ohio, assignor to Avco Manufacturing Corporation, Cincinnati, Ohio, a corporation of Delaware Application August 30, 1950, Serial No. 182,297

8 Claims. (Cl. 178—5.8)

The present invention relates generally to television receivers. Specifically my invention relates to a simple volume and contrast control unit which is well suited to function as part of a remote control station for a television receiver.

Since the very first cathode-ray tube type television set was sold, the consumer has been continually asserting a demand for receivers capable of larger picture reproduction. It is with these large sets that we are concerned because of the tuning problem which large picture reproduction presents.

Naturally the observer would like to tune in his television receiver from or near to his normal viewing position so that distortion could be tuned out and picture contrast could be correctly adjusted. The best viewing distance is fixed at about four to eight times the picture height depending upon the individual visual acuity of the observer and on picture brightness. This fixed relationship was no problem at first because with the smaller size picture tubes an observer could tune the set standing near arms length away and be sure of a correct adjustment. However, with sets using 16'' tubes or larger it obviously becomes impossible to adjust while keeping the desired distance from the tube face, unless the tuning unit is separated from the picture unit. Thus it has become necessary to tune conventional receivers by a cut-and-try method, tuning and returning after stepping back and observing the result. Recognizing this problem, some manufacturers now provide either mechanical or electronic remote control tuning units, so that the observer can quickly tune in the desired station, adjust for proper contrast and set the sound volume to please the eye and ear. We are here concerned with the electronic type.

The prior art dealing with remote control TV units is still rather limited, though growing. The few electronic circuits which have been produced appear to be extremely complicated, using a large number of extra circuit elements. Seemingly no one has heretofore thought of taking full advantage of the intercarrier sound type receiver circuit for this purpose. For example, I have found that I can take advantage of the relationship between the detected picture signal and the 4.5 mc. audio I. F. frequency to simplify audio volume and picture contrast control. I recognized that it would be desirable to produce a single tube unit with which I could selectively control the output amplitude of two closely related frequency bands, namely, the picture signal frequency component and the 4.5 mc. audio I. F. component in an intercarrier sound type TV receiver. Therefore it is a general object of this invention to produce a single tube unit which is capable of selectively controlling the output amplitude of one of two signals impressed across the input of the unit.

It is also a specific object of this invention to produce a simplified remote control station for a television receiver.

Another object of the present invention is to produce a TV receiver remote control unit having only a two signal conductor connection to the picture unit.

It is a further object of the present invention to produce a simplified volume and contrast control for an intercarrier sound type television receiver.

In the illustrated embodiment of my invention I have shown my simplified volume and contrast control unit incorporated into an intercarrier sound system. As will hereinafter be more fully explained, I take the output from the second detector and feed it to the grid circuit of a conventional triode which along with an associated circuit acts as a voltage divider to the 4.5 mc. audio I. F. signal. By adjusting a frequency dependent unit in the voltage divider circuit I am able to control the amplitude of the audio I. F. signal which is fed to the video amplifier input terminals.

For a better understanding of the present invention, together with other and further objects, advantages and capabilities thereof, reference is made to the following disclosure and appended claims in connection with the accompanying drawing, in which I have shown my novel volume and contrast control unit inserted in an intercarrier sound type TV receiver.

This type of TV receiver differs from conventional receivers in that it uses one I. F. channel with a bandwidth great enough to pass both the picture and sound I. F. signals obtained from a conventional first detector. Before the signal is fed to this I. F. stage it is picked up on an antenna 1 which is connected to a conventional tuner and R. F. amplifier unit 2. After being amplified in the R. F. amplifier the signal is fed to the first detector stage 3 which may or may not act as the first stagger tuned element in the I. F. amplifier 4. The output of the I. F. amplifier is then fed to a second detector 5 whose action in an intercarrier sound system is too well known to require an exhaustive explanation. For those who may be unfamiliar with this type of receiver, reference is made to the United States patent Parker 2,448,908 which issued September 7, 1948. To briefly review the function of the second detector, the 4.5 mc. sound signal is obtained in the output circuit and is amplified in the video amplifier prior to being tapped off, amplified and detected in the audio channel. In conventional receivers the second detector 5 would act as the video detector, but in an intercarrier sound receiver, since unit 5 provides both the 4.5 mc. sound I. F. as well as the video signals, it is no longer merely a video detector and is thus called the second detector.

As is brought out in the above mentioned Parker patent, the sound signal in I. F. amplifier 4 is sufficiently attenuated relative to the picture carrier so as to make the sound I. F. response about 10% of maximum gain, compared to 50 to 60% for the picture carrier. This way, the picture carrier provides an effective local oscillator signal that beats with the I. F. sound carrier producing a difference signal frequency of 4.5 mc. As is well known this results from the fact that when two signal voltages of slightly different frequencies are mixed, the resultant wave varies in amplitude at the difference frequency and has the original modulation of the weaker of the two input signals which in this case is the audio.

Both the detected picture signal, including sync pulses and blanking pulses, and the 4.5 mc. sound I. F. signal are impressed across lines 7 and 8 which in the illustrated circuit is the output of remote control unit A. This two conductor cable impresses the signal between terminal 11 and ground of picture unit B. Separation of the sound and video signals is usually accomplished in the last video output stage, herein shown as tube 12, where a trap circuit 13, tuned to 4.5 mc., is used to pick off the sound signal while rejecting the sound carrier I. F. signal from the picture tube grid circuit. The FM sound signal having a center frequency of 4.5 mc. is then coupled to a conventional FM detection system and subsequent amplifier stage not shown. So far, the explanation has dealt with the receiver as a whole. Operation of a specific embodiment of my novel circuit, shown in the dashed outline 15, will now be considered.

This circuit comprises an amplifier 16, illustrated as a triode but of course not limited thereto, having a grid 17 which is coupled through resistance 18 and capacitor 19 to the output of second detector 5. The plate 20 is coupled through a frequency dependent network comprising inductance 21, variable resistance 22 and capacitor 23, to a source of plate potential B+, not shown. The cathode 24 is connected through a potentiometer 25 to ground. The output of the potentiometer, which is fed to the first stage of video amplification in the picture unit, is taken between the variable arm 26 and ground. It can be seen that there are only two conductors used to connect the output of the remote control unit and the picture unit, namely, conductors 7 and 8.

In order to understand operation of my combined volume and contrast control unit 15, it is necessary to understand the type of signal which is being fed into the unit from the output of the second detector 5. First, there is the video signal, sans carrier. Second, there is the FM sound signal with a center frequency of 4.5 mc. In other words the audio signal is still modulated on a 4.5 mc. carrier. Since both of these signals are impressed on the grid 17, the electron current that flows through triode 16 contains these same two components.

The frequency dependent network in the plate circuit of triode 16 can be considered as a 4.5 mc. wave trap shunted by a variable resistance 22. Assuming that resistance 22 has infinite resistance, then it can be seen that the wave trap comprising inductance 21 and capacitor 23 will offer maximum impedance to a 4.5 mc. signal. Now assume that resistance 22 has some finite resistance value which is less than the impedance offered to a 4.5 mc. signal by the wave trap alone. Then it can be seen that there are effectively two impedances in parallel, resistance 22 being the smaller of the two and thus controlling the maximum impedance of the network. Therefore, the impedance of the complete wave trap and shunted resistance 22 must be less than the resistance of resistor 22. It follows then, that the impedance of this unit decreases or increases as the resistance of resistor 22 is decreased or increased.

The second element in my frequency responsive voltage divider comprises potentiometer 25, which being a plain resistance has a substantially frequency independent impedance. Thus it can be seen that, as far as the video signal is concerned, since the plate impedance or wave trap is tuned to 4.5 mc., unit 15 is a conventional cathode follower type circuit which offers little if any plate impedance to the picture component. As for the 4.5 mc. sound carrier, however, the impedance of the plate circuit tuned trap and the cathode potentiometer are both important, forming in effect a voltage divider. If it be assumed that the A.-C. voltage effectively supplied by tube 12 is constant, it should be apparent that the signal drop would divide between these two impedances in accordance with the ratio of their individual impedances to the total divider impedance. In actual practice even though the A.-C. voltage effectively supplied by tube 12 is a function of the plate load impedance, any increase of the trap impedance decreases the 4.5 mc. signal drop across the potentiometer because the resulting increase in A.-C. signal impressed across the divider is not as large as the increase in 4.5 mc. signal drop across the trap circuit. Thus, as the resistance of resistor 22 is increased, there is a decrease in the 4.5 mc. signal drop across the cathode potentiometer.

It now should be obvious that the frequency dependent network in the plate circuit of triode 16 functions as a voltage divider in conjunction with cathode connected potentiometer 25, acting on the 4.5 mc. audio signal alone. Also it can be seen that triode 16 acts as a cathode-follower unit as far as the picture signal component is concerned. As is well known, the contrast of the reproduced picture depends upon the amplitude of the picture signal component and by adjusting potentiometer 25 this amplitude can be changed. It will be noticed that potentiometer 25 also controls the amplitude of the audio signal. This is of little concern since, once the contrast is adjusted correctly, the frequency network in the plate circuit of triode 16 acts as a separate control of the sound volume.

While I do not desire to be limited to any specific circuit parameters such parameters varying in accordance with individual designs, the following circuit values have been found entirely satisfactory in the illustrated embodiment of the invention:

| | |
|---|---|
| Potentiometer 25 | 100 ohms. |
| Lines 7—8 | 95 ohm cable. |
| Resistance 18 | 33 ohms. |
| Resistance 22 | 100,000 ohms. |
| Resistance 27 | 1 megohm. |
| Capacitor 19 | .1 microfarad. |
| Capacitor 23 | 50 micromicrofarads. |
| Inductance 21 | 25 microhenrys. |

While there has been shown and described what at present is considered the preferred embodiment of the present invention, it will be obvious to those skilled in the art that various changes and modifications may be made therein without departing from the invention as defined by the appended claims.

Having thus described my invention I claim:

1. In a television receiver the combination comprising a source of audio intermediate frequency signals and video signals, a voltage divider unit comprising an impedance tuned to said intermediate frequency and a series connected potentiometer, vacuum tube means for impressing said signals across said voltage divider, a signal utilization circuit connected across the variable portion of said potentiometer, variable resistance means coupled across said tuned impedance, whereby adjustment of said variable resistance means controls the amplitude of the intermediate frequency signals impressed across said potentiometer and whereby adjustment of said potentiometer controls the amplitude of both the audio intermediate frequency and video signals fed to the utilization circuit.

2. In an intercarrier-sound type television receiver the combination comprising a source of audio intermediate frequency signals and video signals, a voltage divider unit comprising an impedance tuned to said intermediate frequency and a potentiometer connected in series therewith, means for impressing said signals across said voltage divider, a signal utilization circuit connected across the variable portion of said potentiometer, variable resistance means coupled across said tuned impedance, whereby adjustment of said variable resistance means controls the amplitude of the intermediate frequency signals impressed across said potentiometer and whereby adjustment of said potentiometer controls the amplitude of both the audio intermediate frequency and video signals fed to the utilization circuit.

3. In a signal translating system the combination comprising a potentiometer, an output circuit coupled across the variable portion of said potentiometer, a signal source for providing a plurality of signals including a first signal having a fixed mean frequency and a second signal having a frequency bandwidth fixedly spaced outside of the bandwidth of said first signal, an impedance network connected in series with said potentiometer, said network comprising a circuit tuned to said first mean frequency and a variable resistor connected in parallel with said tuned circuit, vacuum tube means for impressing said signals across said series connected potentiometer and impedance network, whereby adjustment of said variable resistor varies the amplitude of said first signal impressed across said potentiometer, and whereby adjustment of the potentiometer varies the amplitude of both signals across said utilization circuit.

4. In a signal translating system the combination comprising a potentiometer, a utilization circuit coupled across the variable portion of said potentiometer, a signal source for providing a plurality of signals including a first signal having a fixed mean frequency and a second signal having a frequency bandwidth outside of the bandwidth of said first signal, an imepdance network connected in series with said potentiometer, said network comprising a circuit tuned to the mean frequency of said first signal and a variable resistor connected in parallel with said tuned circuit, means for impressing said signals across said series connected potentiometer and impedance network, whereby adjustment of said variable resistor varies the amplitude of said first signal impressed across said potentiometer, and whereby adjustment of the potentiometer varies the amplitude of both signals across said utilization circuit.

5. In an intercarrier sound type television receiver the combination comprising a source of audio intermediate frequency signals and video signals, a potentiometer having an output circuit coupled across its variable portion, a resonant circuit tuned to the fixed mean frequency of said audio intermediate frequency signals, single tube means having an anode-cathode path connected in series with said resonant circuit and said potentiometer across a plate supply source, a variable resistor connected across said resonant circuit, means coupling said signal source to a control grid of said tube means, whereby said variable resistor acts as an audio volume control and whereby said potentiometer acts as a video contrast control.

6. In an intercarrier sound type television receiver the combination comprising a source of audio intermediate frequency signals and video signals, a potentiometer having an output circuit coupled across its variable portion, single tube means for impressing said signals across said potentiometer in series with a resonant circuit tuned to the fixed mean frequency of said audio intermediate frequency signals, a variable resistor connected across said resonant circuit, whereby said variable resistor acts as an audio volume control and whereby said potentiometer acts as a video contrast control.

7. In a signal translating system the combination comprising a potentiometer, an output circuit connected across the variable portion of said potentiometer, means for impressing a plurality of signals across a series circuit comprising said potentiometer and a resonant impedance tuned to the mean frequency of only one of said signals, the frequency bandwidths of said signals being non-overlapping and fixedly spaced in the frequency spectrum, a variable resistor connected across said resonant means, whereby adjustment of said variable resistor varies the amplitude of said one of said signals impressed across said potentiometer.

8. In a signal translating system the combination comprising a potentiometer, an output circuit connected across the variable portion of said potentiometer, means for impressing a plurality of signals across a series circuit comprising said potentiometer and a resonant impedance tuned to the mean frequency of only one of said signals, the frequency bandwidths of said signals being non-overlapping and spaced at least 4.5 megacycles apart, a variable resistor connected across said resonant means, whereby adjustment of said variable resistor varies the amplitude of said one of said signals impressed across said potentiometer.

HOMER G. BOYLE.

References Cited in the file of this patent

UNITED STATES PATENTS

| Number | Name | Date |
|---|---|---|
| 2,037,753 | Barton | Apr. 21, 1936 |
| 2,068,112 | Rust | Jan. 19, 1937 |
| 2,074,852 | Nelson | Mar. 23, 1937 |
| 2,182,328 | Weinberger | Dec. 5, 1939 |
| 2,227,056 | Blumlein et al. | Dec. 31, 1940 |
| 2,289,821 | Boucke | July 14, 1942 |
| 2,296,921 | Green | Sept. 29, 1942 |
| 2,351,934 | Kramolin | June 20, 1944 |